May 5, 1964  
L. MIRVIS  
3,131,802  
FEEDER BOWL

Filed March 24, 1960  
2 Sheets-Sheet 1

INVENTOR.  
LEONARD MIRVIS  
BY Whittemore  
Hulbert & Belknap  
ATTORNEYS

May 5, 1964    L. MIRVIS    3,131,802
FEEDER BOWL
Filed March 24, 1960    2 Sheets-Sheet 2
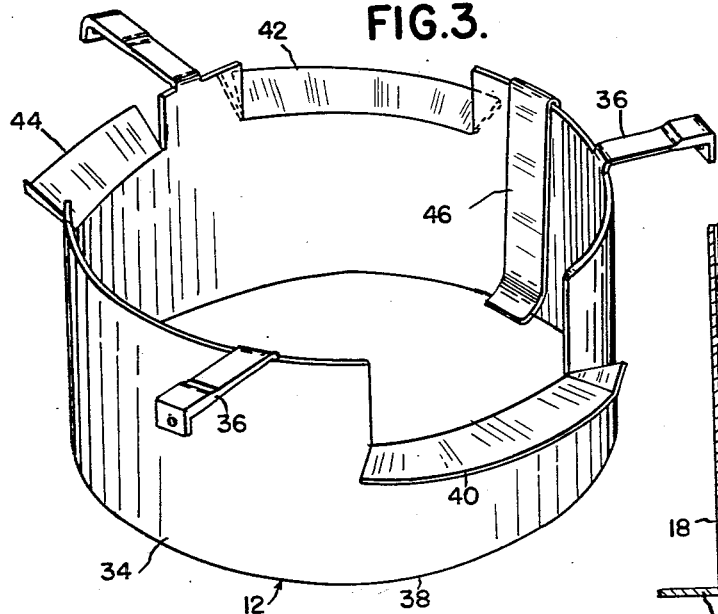
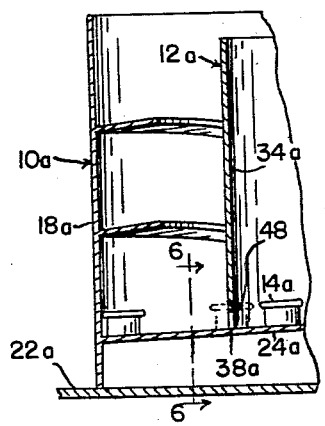
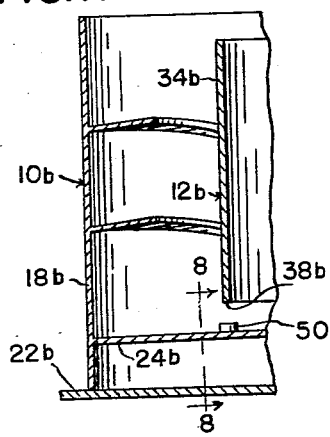
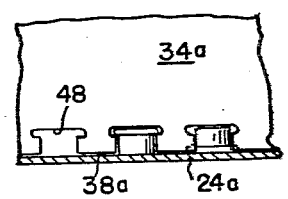
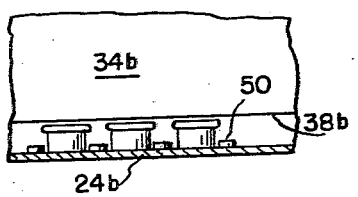
INVENTOR.
LEONARD MIRVIS
BY Whittemore
Hulbert & Belknap
ATTORNEYS

3,131,802
FEEDER BOWL
Leonard Mirvis, Detroit, Mich., assignor to Parke, Davis & Company, Detroit, Mich., a corporation of Michigan
Filed Mar. 24, 1960, Ser. No. 17,310
9 Claims. (Cl. 198—33)

The invention relates generally to feeder bowls and refers more particularly to a vibratory feeder bowl including means for preventing nesting of objects such as caps during feeding thereof and means for properly orienting the caps for feeding.

In the past feeder bowls of the type including cylindrical side walls having a helical ramp on the interior thereof extending from a closed bottom to an open top whereby on imparting to the feeder bowl an arcuate oscillatory vibrating motion caps or similar articles placed in the feeder bowl are caused to proceed outwardly from the center thereof and up the ramp to be discharged from the top thereof have been known. Also means have been provided in conjunction with such devices to return to the bottom of the bowl objects on the ramp thereof which are nested and which are improperly oriented.

With prior devices however the rate of feeding objects from the feeder bowls has been slow so that entire packaging operations are often dependent upon the speed at which the feeder bowls are capable of feeding caps or similar objects therefrom. The slow rate of feed of prior feeder bowls has been in a great measure due to the nesting of caps or similar shaped objects open on one side before they are fed onto the ramp of the feeder bowl, thus necessitating a return to the bottom of the bowl of a great number of the objects, sometimes approaching ninety percent, fed onto the ramp.

In addition further objects are returned to the bottom of the feeder bowl due to the fact that after the nested articles are displaced from the ramp the remaining articles are spaced so far apart that the vibratory action of the feeder bowls causes excessive movement of the remaining articles. This excessive movement may cause an additional fifty percent of the remaining ten percent to be fed back into the feeder bowl.

Also since it is usually desired to have objects as they pass from the feeder bowl oriented in a particular way and since objects are usually oriented randomly as they are fed onto the ramp of prior feeder bowls an additional fifty percent of the objects may be returned to the bottom of prior feeder bowls by known means because of improper orientation.

Therefore it is one of the objects of the present invention to provide a vibratory feeder bowl including means for preventing feeding of nested objects to the ramp of the feeder bowl.

Another object is to provide a vibratory feeder bowl including means for preventing feeding objects onto the ramp of the feeder bowl which have undesirable orientations.

More specifically it is an object of the present invention to provide a vibratory feeder bowl including a cylindrical outer wall member, a helical ramp extending from the closed bottom of the feeder bowl to the open top thereof and a cylindrical insert positioned within the feeder bowl, the lower edge of said insert being spaced above the bottom of the feeder bowl by a dimension sufficient to permit passage of a properly oriented object to be fed from the feeder bowl between the bottom of the feeder bowl and said lower edge.

Still more specifically it is an object of the present invention to provide a vibratory feeder bowl including a cylindrical outer wall member, a helical radially inwardly extending ramp secured to the inside of the cylindrical outer wall member and extending between the closed bottom of the feeder bowl and the open top thereof, said feeder bowl also including means for returning nested or improperly oriented caps or similar objects back into the feeder bowl, and a cylindrical insert adapted to be supported by the cylindrical outer wall member which cylindrical insert is substantially concentric with the outer wall member and spaced inwardly thereof, said insert having a lower edge spaced from the bottom of the feeder bowl by a dimension sufficient to permit only properly oriented objects to pass between said lower edge and the bottom of the feeder bowl, and including inclined aprons for receiving and feeding back into the center of the cylindrical insert objects discharged from the ramp of the feeder bowl due to wrong orientation or nesting thereof.

Another object is to provide a feeder bowl as set forth above including means for periodically reorienting objects placed within the cylindrical insert.

Another object is to provide a feeder bowl as set forth above including a clip secured to the cylindrical insert having a lower portion immediately adjacent the bottom edge of the insert extending downwardly and radially inwardly of the insert operable to periodically reorient objects placed within the insert.

Another object is to provide a feeder bowl having an insert as set forth above and including a series of angularly spaced bosses secured to the bottom of the feeder bowl immediately below the lower edge of the insert whereby objects not properly oriented for discharge from the feeder bowl are prevented from proceeding outward from the insert onto the ramp of the feeder bowl.

Another object is to provide a feeder bowl as set forth above wherein the bottom edge of the insert extends substantially to the bottom of the feeder bowl and notches are provided in the bottom edge of the insert shaped to permit only objects properly oriented for discharge from the feeder bowl and positioned within the insert to pass out through said notches and onto the ramp of the feeder bowl.

Another object is to provide an insert to be used with existing feeder bowls to prevent nested objects or objects having undesirable orientation from entering onto the ramp thereof.

Another object is to provide an improved feeder bowl as set forth above which is simple in structure, economical to manufacture and efficient in use.

Other objects and features of the invention will become apparent as the description proceeds, especially when taken in conjunction with the accompanying drawings, illustrating a preferred embodiment of the invention, wherein:

FIGURE 3 is a perspective view of the feeder bowl insert illustrated in FIGURES 1 and 2.

FIGURE 4 is a partial section of the feeder bowl and feeder bowl insert illustrated in FIGURE 1 taken on the line 4—4 in FIGURE 1.

FIGURE 5 is a partial section of a modified feeder bowl and feeder bowl insert similar to that shown in FIGURES 1–4 and further including means to prevent improperly oriented articles from passing onto the ramp of the feeder bowl.

FIGURE 6 is a partial section view of the feeder bowl and feeder bowl insert illustrated in FIGURE 5 taken on the line 6—6 in FIGURE 5.

FIGURE 7 is a partial section of a modified feeder bowl and feeder bowl insert similar to that shown in FIGURES 1–4 and further including means to prevent improperly oriented articles from passing onto the ramp of the feeder bowl.

FIGURE 8 is a partial section view of the feeder bowl and feeder bowl insert illustrated in FIGURE 7 taken on the line 8—8 in FIGURE 7.

With reference to the drawings a particular embodiment of the invention will now be disclosed.

Figure 1:
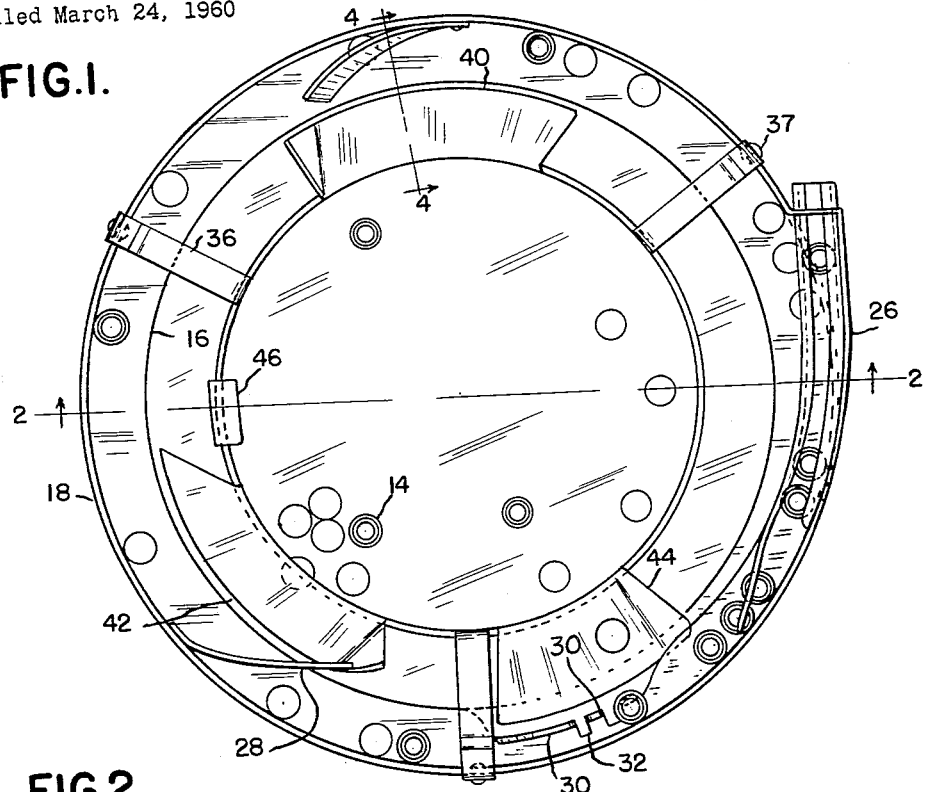
FIGURE 1 is a top view of a feeder bowl and feeder bowl insert according to the invention.
Figure 2:
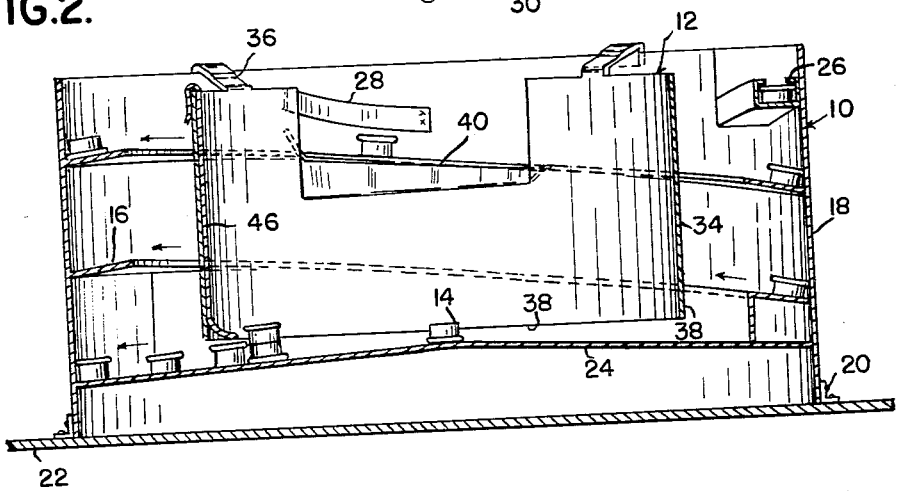
FIGURE 2 is a section view of the feeder bowl and feeder bowl insert shown in FIGURE 1 taken on the line 2—2 in FIGURE 1.

In accordance with the invention a feeder bowl generally indicated 10 as shown best in FIGURES 1 and 2 is provided with an insert generally indicated 12 whereby objects such as caps 14 placed within the insert 12 are prevented from passing radially outwardly from the insert while in a nested position to prevent nested caps from entering onto the ramp 16 of the vibratory feeder bowl 10.

In addition the insert 12 as shown in FIGURES 1–4 may be modified as shown in FIGURES 5 or 6 or the feeder bowl 10 may be modified as shown in FIGURES 7 and 8 to prevent caps which are improperly oriented from being fed to the ramp 16 of the feeder bowl 10.

More specifically the feeder bowl 10 comprises the cylindrical side wall member 18 secured by convenient means such as brackets 20 to a base 22. The feeder bowl 10 also includes the radially outwardly and downwardly sloping bottom 24, and the helical ramp 16 extending from the bottom 24 to the chute 26 adjacent the open top of the feeder bowl into which chute it is desired to feed caps placed within the feeder bowl.

It will be understood that in operation of the feeder bowl that the base 22 may be given an arcuate oscillatory vibrating movement by convenient well known means not here under consideration so that the caps 14 placed in the feeder bowl will proceed radially outwardly onto the lower portion of the ramp 16 and will be fed up the ramp to the chute 26.

As shown in FIGURE 1 the feeder bowl is provided with spring fingers 28 positioned above the ramp in selected locations therearound to discharge nested caps back into the feeder bowl.

Further it will be noted that if it is essential that the cap be properly oriented as they enter chute 26 any form of conventional selective discharge means may be provided near the end of the ramp 16 to prevent caps which have their open sides down from passing into the chute 26. For example, as shown in FIG. 1, an upstanding ridge 30 may be provided adjacent and outwardly of a cut-away portion of the ramp. Ridge 30 terminates just ahead of a pair of spaced recesses 32. As each cap 14 advances along upstanding ridge 30 its inner edge is raised and the cap thus tilted upwardly and outwardly. When the tilted cap drops off the end of ridge 30 it lands on the recesses or notched area of the ramp. If the cap is correctly oriented with the open side thereof up, the tongue formed by the area of the ramp surface between recesses 32 will support the cap by engaging its closed end so that it remains balanced on the ramp and can proceed onward into chute 26. If the cap is misoriented with its open side down, a major portion of its skirt then overlies recesses 32 and thus is unsupported by the ramp surface. Hence the cap will tip over and fall off the recessed edge of the ramp onto the hereinafter described apron 44 which returns the misoriented cap back into insert 12.

In the operation of the feeder bowl as thus far described it will be understood that on placing a plurality of caps 14 within the bowl that the caps tend to nest and may be fed onto the ramp in random orientation and in a nested condition. Thus during the travel of the caps from the bottom of the feeder bowl to the top thereof on ramp 16 a large percentage of the caps are displaced back into the feeder bowl by the fingers 28 and the aforementioned conventional selective discharge means.

The percentage of caps fed back into the feeder bowl may easily approach ninety-five percent of the caps fed onto the ramp. Thus the number of caps fed to the chute 26 is extremely small in comparison to the possible number which could be fed thereto if the caps entering onto the ramp were properly oriented and not nested.

Therefore in accordance with the invention an insert 12 is provided for the feeder bowl 10. The insert 12 as best shown in FIGURE 3 comprises a cylindrical member 34 adapted to be supported on the side wall member 18 of the feeder bowl 10 by means of brackets 36. The brackets 36 may be secured in a fixed position on the feeder bowl 10 by convenient means such as through openings in the brackets and feeder bowl and the bolts 37 as shown.

The cylindrical member 34 of the insert 12 is concentric with the cylindrical side wall member 18 of the feeder bowl 10 and the bottom edge 38 thereof is held in spaced relation to the bottom 24 of the feeder bowl 10. The spacing between the bottom edge 38 of the cylindrical member 34 and the bottom 24 of the feeder bowl is sufficient to just allow a cap properly oriented to pass out of the feeder bowl to pass between the edge 38 of the insert and the bottom 24 of the feeder bowl.

Thus caps to be fed from the feeder bowl which are placed within the cylindrical insert are prevented from feeding radially outwardly onto the ramp 16 when they are nested due to the added height of nested caps.

The insert 12 is further provided with aprons 40 and 42 extending radially outwardly therefrom immediately adjacent and slightly below the ramp alongside of the fingers 28 to receive caps which are forced from the ramp by means of the fingers 28 due to nesting thereof which might possibly occur due to falling of a cap from the ramp into the space between the insert and the side walls of the feeder bowl.

Additionally an apron 44 is provided on the cylindrical member 34 of the insert 12 adjacent the exit end of ramp 16 to return caps having an undesirable orientation to the center of the insert.

A clip 46 shaped as shown best in FIGURES 2 and 3 is attached to the insert 12 and is operable to periodically reorient caps within the insert 12. This reorientation may take the form of merely tipping the nested caps so that they will become unnested and to prevent caps from completely lining the inside of the insert around the bottom thereof with the caps resting on their sides.

Thus in use of the feeder bowl of the invention as disclosed in FIGURES 1–4 caps 14 to be fed to chute 26 are placed within the insert 12 and the feeder bowl is given an arcuate oscillatory vibrating motion which causes the caps to be fed radially outwardly of the feeder bowl and insert whereby caps which are unnested pass outwardly between the bottom 24 of the feeder bowl and the lower edge 38 of the insert and onto the ramp 16.

The caps then proceed up the ramp 16. Any caps proceeding up the ramp which should by chance become nested after passing the bottom edge of the insert 12 will be returned into the center of the insert by means of the fingers 28 and the aprons 40 and 42. The remaining caps having improper orientation will be returned to the center of the insert 12 as they pass over the aforementioned conventional selective discharge means by means of the apron 44. The properly oriented not nested caps remaining on the ramp 16 will be fed to chute 26.

Thus by the inclusion of a simple insert in a feeder bowl the number of caps or similar articles which can be fed from a feeder bowl is greatly multiplied.

A modification of the invention as illustrated in FIGURES 1–4 is shown in FIGURES 5 and 6. In FIGURE 5 the cylindrical member 34a of the insert 12a rests on the bottom 24a of the feeder bowl 10a or may be supported a very small distance thereabove as shown. Notches 48 shaped in the form of caps 14a in their properly oriented position are provided circumferentially around the lower edge 38a of the cylindrical member 34a. Thus only caps oriented in the proper position are permitted to pass out of the insert 12a through the notches 48 to be fed to the ramp 16a.

In FIGURES 7 and 8 a further modification of the present invention illustrating a second structure whereby only properly oriented caps are fed from the insert 12b to the ramp 16b is shown. In FIGURES 7 and 8 a plurality of studs 50 are secured to the bottom 24b of the feeder bowl 10b immediately beneath the lower edge 38b of the cylindrical member 34b of insert 12b. The studs 50 are spaced angularly so that only caps 14b having proper orientation are permitted to pass between the lower edge 38b of the insert and the bottom 24b of the feeder bowl as shown in FIGURE 8.

Thus applicant has provided apparatus for preventing nested articles from being fed to the ramp of a feeder bowl and further for permitting feeding to the ramp of the feeder bowl of only objects which are properly oriented. Thus rejections from the feeder bowl ramp of objects after they have substantially traversed the ramp are practically eliminated and the number of objects which may be fed from a feeder bowl in a given period of time is greatly increased.

The drawings and the foregoing specification constitute a description of the improved feeder bowl in such full, clear, concise and exact terms as to enable any person skilled in the art to practice the invention, the scope of which is indicated by the appended claims.

What I claim as my invention is:

1. A vibratory feeder comprising a bowl having an upstanding annular wall and a bottom surface closing the lower end of said bowl and providing an area for receiving objects to be fed from the bowl, a helical ramp on the inside of said wall having an entrance at said bottom surface, said ramp rising gradually and terminating at an outlet of said bowl such that on vibratory reciprocation of the feeder bowl objects placed on said receiving area of said bottom surface advance onto and up said ramp to be discharged at said outlet, partition means disposed within said bowl between the ramp entrance and the object receiving area of said bottom surface, said partition means having a bottom edge shaped and positioned relative to said bottom surface to form a restricted passage therebetween adapted to prevent nested objects from feeding from the receiving area to said ramp, and means located on the side of said partition means remote from said ramp entrance and projecting over said receiving area at a predetermined elevation from said bottom surface such that nested objects engage said projecting means and are thereby de-nested from one another.

2. The combination set forth in claim 1 including means forming with said bottom edge of said partition means and with said bottom surface of said bowl at least one opening in said restricted passage adapted to permit passage of only unnested and correctly oriented objects therethrough to the ramp area.

3. The combination set forth in claim 1 wherein said partition means comprises a wall member extending downwardly substantially to the bottom of said feeder bowl, said wall member having at least one downwardly opening notch therein the upper edge of which comprises said bottom edge of said partition means and the sides of which are spaced and shaped such that said notch has substantially the same shape as the cross-section of properly oriented and unnested objects disposed on said bowl bottom surface to permit passage of only such objects therethrough.

4. The combination set forth in claim 1 wherein said bottom edge of partition means is spaced uniformly above said bottom surface to form said restricted passage, said bottom surface of said bowl having at least one pair of studs secured thereto immediately beneath said bottom edge of said partition means and spaced from one another to permit only properly oriented objects to pass therebetween.

5. The combination set forth in claim 1 wherein said partition means comprises an open-ended hollow annular insert suspended within said feeder bowl with the bottom open and thereof shaped to form said bottom edge.

6. The combination set forth in claim 5 wherein said insert includes an apron extending radially outwardly and upwardly from a side of said insert over said bowl bottom surface and terminating adjacent said ramp for receiving objects falling from said ramp, said apron communicating with the interior of said insert to discharge objects falling from said ramp back into said insert.

7. The combination set forth in claim 1 wherein the objects being fed comprise open-ended caps or the like and wherein said projecting means is spaced above said bottom surface a distance less than the height of said caps when disposed on their sides and greater than the height of said caps when disposed on one of their ends to thereby tip over caps disposed on their sides to thereby prevent such caps from blocking the restricted passage.

8. The combination set forth in claim 1 including a clip removably attached to said partition means and having a portion extending radially inwardly therefrom forming said projecting means.

9. A vibratory feeder for supplying a single file output of unnested objects of a type having a tendency to cling together by nesting on top of one another, said feeder comprising a bowl having an upstanding annular wall and a bottom surface closing the lower end of said bowl and providing an area for receiving the objects to be fed from the bowl, a helical ramp on the inside of said wall having an entrance at said bowl bottom surface, said ramp rising gradually and terminating at an outlet of said bowl such that on vibratory reciprocation of the feeder bowl objects placed on said receiving area of said bottom surface advance onto and up said ramp substantially in single file formation to be discharged at said outlet, partition means disposed within said bowl and forming a barrier between the ramp entrance and the receiving area of said bottom surface, said partition means having a bottom edge shaped and positioned relative to said bottom surface to form a restricted passage therebetween adapted to prevent nested objects from leaving the receiving area bounded by said partition means, means associated with said ramp for deflecting nested objects from the ramp so that they fall towards said bowl bottom surface and inclined apron means having one end thereof positioned to catch objects removed from said ramp by said deflecting means and the other end thereof positioned to return the caught objects to the receiving area bounded by said partition means.

References Cited in the file of this patent
UNITED STATES PATENTS

| | | |
|---|---|---|
| 2,667,961 | Reese | Feb. 2, 1954 |
| 2,725,971 | Clark | Dec. 6, 1955 |
| 2,858,008 | Dilts | Oct. 28, 1958 |

UNITED STATES PATENT OFFICE
CERTIFICATE OF CORRECTION

Patent No. 3,131,802                      May 5, 1964

Leonard Mirvis

It is hereby certified that error appears in the above numbered patent requiring correction and that the said Letters Patent should read as corrected below.

Column 6, line 12, for "and" read -- end --.

Signed and sealed this 15th day of September 1964.

(SEAL)
Attest:

ERNEST W. SWIDER
Attesting Officer

EDWARD J. BRENNER
Commissioner of Patents